United States Patent
Mizusawa et al.

(10) Patent No.: US 11,813,740 B2
(45) Date of Patent: Nov. 14, 2023

(54) CAMERA AND ROBOT SYSTEM

(71) Applicant: PANASONIC I-PRO SENSING SOLUTIONS CO., LTD., Fukuoka (JP)

(72) Inventors: Tetsuya Mizusawa, Fukuoka (JP); Hiroyuki Ishihara, Fukuoka (JP); Yoshihiro Inoue, Fukuoka (JP); Shinichi Tsukahara, Fukuoka (JP); Tatsuo Kamei, Fukuoka (JP); Yuki Yoshikuni, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 411 days.

(21) Appl. No.: 16/883,461

(22) Filed: May 26, 2020

(65) Prior Publication Data
US 2020/0376690 A1  Dec. 3, 2020

(30) Foreign Application Priority Data

May 30, 2019  (JP) .................. 2019-101817
Aug. 5, 2019   (JP) .................. 2019-143636

(51) Int. Cl.
*B25J 9/00* (2006.01)
*B25J 19/02* (2006.01)
*B25J 9/16* (2006.01)
*G05B 19/401* (2006.01)

(52) U.S. Cl.
CPC ........... *B25J 19/023* (2013.01); *B25J 9/1697* (2013.01); *G05B 19/401* (2013.01); *G05B 2219/37017* (2013.01); *G05B 2219/37208* (2013.01)

(58) Field of Classification Search
CPC ...... B25J 19/023; B25J 9/1697; B25J 9/1666; B25J 9/1676; B25J 9/161; B25J 19/04; G05B 19/401; G05B 2219/37017; G05B 2219/37208; G05B 2219/39091; G05B 2219/40476
See application file for complete search history.

(56) References Cited

U.S. PATENT DOCUMENTS 11,017,205 B2 * 5/2021 Kang ............. G06V 20/647
2008/0240511 A1 10/2008 Ban et al.
2013/0085604 A1 * 4/2013 Irie ................ B25J 9/1697
901/46
2013/0230235 A1 9/2013 Tateno et al.
(Continued)

FOREIGN PATENT DOCUMENTS

CN  103659823 A  3/2014
CN  103994728 A  8/2014
(Continued)

OTHER PUBLICATIONS

U.S. Appl. No. 16/785,066 to Hayato Wachi et al., which was filed on Feb. 7, 2020.
(Continued)

*Primary Examiner* — Ian Jen
(74) *Attorney, Agent, or Firm* — GREENBLUM & BERNSTEIN, P.L.C.

(57) ABSTRACT

A camera and a robot system are provided. The camera includes a camera body attached to a tip of a robot arm and a camera unit housed in the camera body. The camera unit has a plurality camera devices that are different in optical characteristics for imaging a workpiece.

15 Claims, 14 Drawing Sheets

(56) References Cited

U.S. PATENT DOCUMENTS

| | | | |
|---|---|---|---|
| 2014/0005484 A1* | 1/2014 | Charles | A61B 17/00 |
| | | | 600/201 |
| 2014/0079524 A1 | 3/2014 | Shimono et al. | |
| 2014/0100694 A1 | 4/2014 | Rueckl et al. | |
| 2014/0173870 A1 | 6/2014 | Otts | |
| 2014/0340515 A1 | 11/2014 | Tanaka et al. | |
| 2017/0210011 A1 | 7/2017 | Hull | |
| 2018/0063507 A1* | 3/2018 | Van Lieu | H04N 23/90 |
| 2018/0311813 A1 | 11/2018 | Kondo et al. | |
| 2019/0347461 A1* | 11/2019 | Kang | G06V 40/10 |

FOREIGN PATENT DOCUMENTS

| | | |
|---|---|---|
| CN | 104703762 A | 6/2015 |
| CN | 106994696 A | 8/2017 |
| CN | 108789362 A | 11/2018 |
| CN | 109760054 A | 5/2019 |
| JP | 2004-001122 A | 1/2004 |
| JP | 2008-246631 A | 10/2008 |
| JP | 2009-241247 A | 10/2009 |
| JP | 2012-123781 A | 6/2012 |
| JP | 2013-078825 A | 5/2013 |
| JP | 2014-009997 A | 1/2014 |
| JP | 2018-146521 A | 9/2018 |

OTHER PUBLICATIONS

Office Action dated Jul. 4, 2023, in corresponding Japanese patent application No. 2019-143636, together with an English translation.

* cited by examiner

CAMERA AND ROBOT SYSTEM

CROSS-REFERENCE TO RELATED APPLICATIONS

This application is based on and claims priority under 35 USC 119 from Japanese Patent Applications No. 2019-101817 filed on May 30, 2019 and No. 2019-143636 filed on Aug. 5, 2019, the contents of which are incorporated herein by reference.

TECHNICAL FIELD

The present disclosure relates to a camera and a robot system.

BACKGROUND ART

A robot system is known in which an arrangement state detection unit having a camera and a laser scanner is disposed above a stocker in which workpieces are set (For example, see Patent document 1). The laser scanner includes a laser light source for generating slit light, a mirror, and a motor for driving the mirror. In this robot system, a distance to each workpiece (i.e., three-dimensional shape information of each workpiece in the stocker) is detected by triangulation on the basis of a rotation angle of the motor, a position of the imaging device of the camera, and a positional relationship between the laser light source, the mirror, and the camera. The robot system performs a control for causing a hand portion to hold one of the plurality of workpieces set in the stocker (e.g., a workpiece located at an easy-to-hold position) on the basis of the detected pieces of positional information. A robot arm is provided with a holding state detection camera which detects a holding state of the workpiece being held by the hand portion.

CITATION LIST

Patent Literature

Patent document 1: JP-A-2013-78825

SUMMARY OF INVENTION

However, in the conventional robot system, since the camera is provided in the arrangement state detection unit which is arranged above the stocker, when the hand portion is brought close to a workpiece to grip it, the arm or hand portion may produce a blind area for the camera, that is, part of the field of view of the camera is interrupted. This results in a problem that the positional accuracy of the hand portion for griping a workpiece is lowered or the position (in other words, coordinates) of a workpiece becomes unknown. Further, in the conventional robot system, if workpieces whose three-dimensional shape information cannot be detected exist in the stocker, the number of workpieces that cannot be held by the hand portion is increased, as a result of which the efficiency of workpiece is made low.

The concept of the present disclosure has been conceived, and hence an object of the disclosure is therefore to provide a camera and a robot system capable of suppressing reduction of the positional accuracy of a hand portion for gripping a workpiece and thereby increasing the efficiency of workpiece.

This disclosure provides a camera including a camera body attached to a tip of a robot arm and a camera unit housed in the camera body. The camera unit has a plurality camera devices that are different in optical characteristics for imaging a workpiece.

The disclosure also provides a robot system including a camera and a controller. The camera has a camera body attached to a tip of a robot arm and a camera unit which is housed in the camera body and has a plurality of camera devices that are different in optical characteristics for imaging a workpiece. The controller generates a control signal for controlling operation of the robot arm on the basis of imaging information acquired by the camera.

According to the present disclosure, reduction of positional accuracy of a hand portion for gripping a workpiece can be suppressed, and thereby efficiency of workpiece can be increased.

DESCRIPTION OF EMBODIMENTS

An embodiment in which a camera and a robot system according to the present disclosure are disclosed in a specific manner will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure sufficiently and are not intended to restrict the subject matter set forth in the claims.

Figure 1:
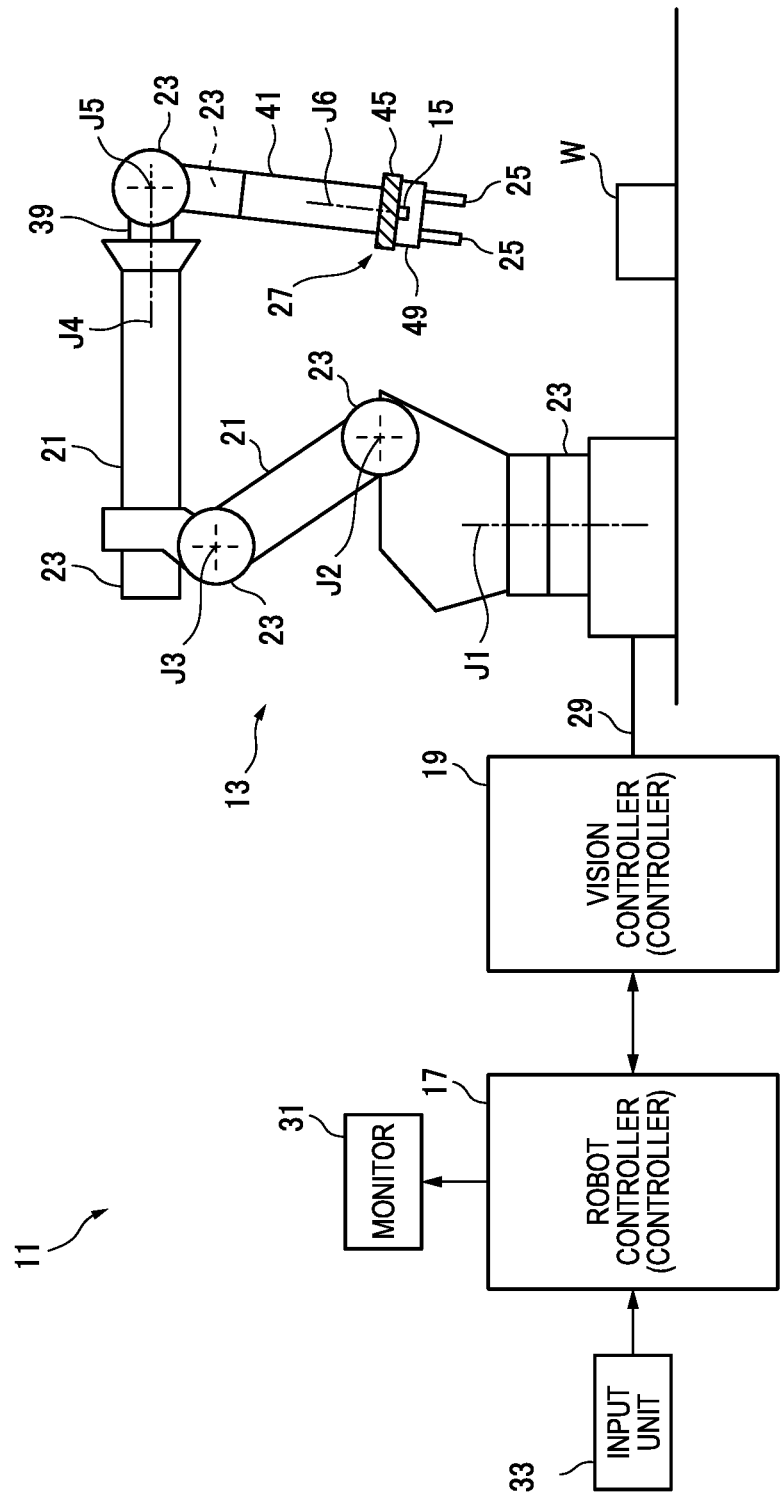
FIG. 1 is a diagram showing a configuration of a robot system according to an embodiment.

FIG. 1 is a diagram showing the configuration of a robot system 11 according to the embodiment. The robot system 11 according to the embodiment includes a robot 13, a camera 15, and a controller (e.g., robot controller 17 and vision controller 19).

The robot 13 is equipped with a robot arm 21. The robot 13 is, for example, a 6-axis (e.g., J1 axis, J2 axis, J3 axis, J4 axis, J5 axis, and J6 axis) articulated robot having six servo motors 23. A tool that is suitable for a purpose of workpiece is attached to a tip of the robot arm 21. In the embodiment, one example tool is a hand portion 27 having a pair of finger members 25. The hand portion 27, which can perform fine workpiece through control of various actuators such as an air cylinder, an electric cylinder, or a motor, can grip and carry a workpiece W.

The J1 axis of the robot 13 serves as s a rotation center in swinging the whole of the robot 13 like panning rotation. The J2 axis of the robot 13 serves as s a rotation center in moving the robot arm 21 in a front-rear direction like tilt rotation. The J3 axis of the robot 13 serves as s a rotation center in moving the robot arm 21 in vertical direction like tilt rotation. The J4 axis of the robot 13 serves as s a rotation center in rotating the wrist of the robot arm 21 like tilt rotation. The J5 axis of the robot 13 serves as s a rotation center in swinging the wrist of the robot arm 21. The J6 axis of the robot 13 serves as s a rotation center in rotating the hand portion 27 of the robot arm 21 like panning rotation.

The controller for causing the robot 13 to perform a prescribed operation is connected to the robot 13 by a cable 29. The J1 axis to the J6 axis of the robot 13 are controlled independently by a control unit 69 (see FIG. 7) of the robot controller 17. The robot controller 17 can move the robot 13 to an intended position correctly by designating, by means of an input unit 33, coordinates of the robot 13 displayed in a monitor 31.

The input unit 33 has input keys and may be equipped with the monitor 31 in an integrated manner. When an operator wants to have the robot 13 perform a prescribed setting operation, he or she inputs, using the input keys, data of mathematical expressions obtained by modeling a movement path that the robot 13 should follow in performing the setting operation.

For example, it is possible to cause the robot 13 to operate using axis coordinate systems given to the respective axes of the robot 13 and an orthogonal coordinate system that has the origin in a free space and correlate portions from the origin to the tips of the hand portion 27 of the robot 13.

Figure 2:
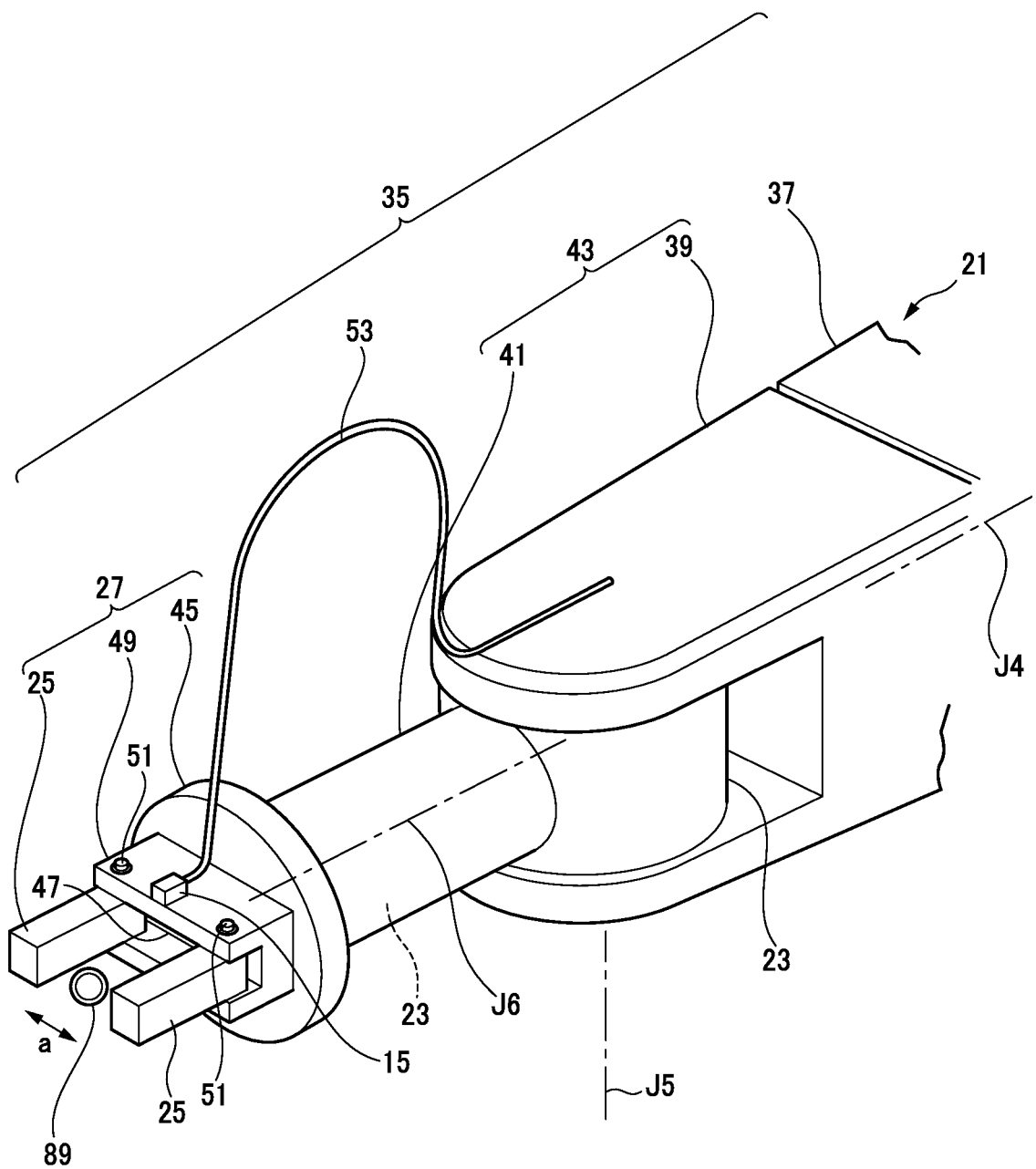
FIG. 2 is an enlarged perspective view of an essential part of a tip of a robot arm.

FIG. 2 is an enlarged perspective view of an essential part of a tip 35 of the robot arm 21. In the robot arm 21, a wrist base portion 39 is connected to an arm tip 37 so as to be rotatable about the J4 axis. A wrist tip 41 is connected to the wrist base portion 39 so as to be swingable about the J5 axis. The wrist base portion 39 and the wrist tip 41 constitute a wrist 43. A hand portion 27 is connected to the wrist tip 41 so as to be rotatable about the J6 axis. The wrist tip 41 incorporates a servo motor 23 (see FIG. 1) for driving the hand portion 27 rotationally.

A base 45 of the hand portion 27 is rotated about the J6 axis by the servo motor 23 incorporated in the wrist tip 41. For example, the base 45 is shaped like a circular disc that is perpendicular to the J6 axis. A bracket 49 formed with a finger member moving groove 47 is fixed to the tip surface of the base 45. A pair of finger members 25 capable of coming closer to and going away from each other are fixed to the bracket 49. The pair of finger members 25 may come closer to and go away from each other by sliding along the finger member moving groove 47. Alternatively, finger tips of the pair of finger members 25 may be allowed to come closer to and go away from each other because their finger base portions are supported rotatably by respective support shafts 51. In the hand portion 27 employed in the embodiment, the pair of finger members 25 are supported rotatably by the respective support shafts 51.

In the robot 13, the arm tip 37 to the hand portion 27 constitute the tip 35 of the robot arm 21.

The camera 15 is attached to the hand portion 27 of the tip 35 of the robot arm 21. More specifically, the camera 15 is fixed to the bracket 49 which is fixed to the base 45 in the plane including its center of gravity. However, the attachment position of the camera 15 is not limited to this position of the bracket 49; the camera 15 may be attached to the tip 35 of the robot arm 21 at any position. The camera 15 is connected to the vision controller 19 by a transmission cable 53.

Figure 3:
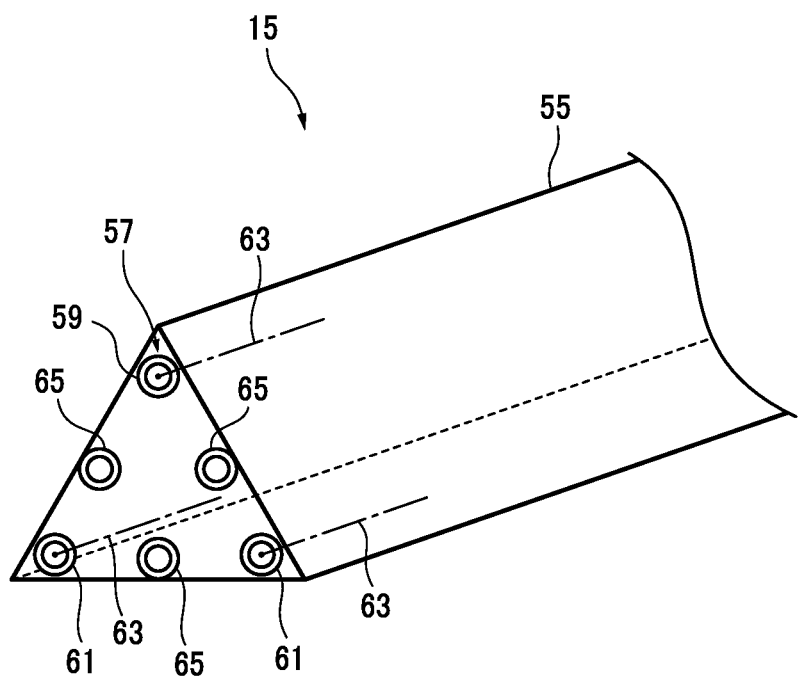
FIG. 3 is an enlarged perspective view of a camera.

FIG. 3 is an enlarged perspective view of the camera 15. The camera 15 is equipped with a camera body 55 which is attached to the tip 35 of the robot arm 21 and a camera unit 57 which is housed in the camera body 55. For example, the camera body 55 is fixed to the bracket 49 of the hand portion 27 in the plane including its center of gravity.

The camera body 55 is disposed at the middle between the pair of finger members 25 which are attached to the tip 35 of the robot arm 21 so as to be able to come closer to and go away from each other (in the direction indicated by arrow a in FIG. 2).

The camera unit 57 is configured in such a manner that one overhead camera 59 and two close-range cameras 61 which are different from the overhead camera 59 in working distance are integrated with each other.

Each of the one overhead camera 59 and the two close-range cameras 61 is a small-diameter camera whose outer diameter is smaller than or equal to 6 mm, for example. The camera body 55 which houses the one overhead camera 59 and the two close-range cameras 61 has such a size as to fit in a circle whose diameter is smaller than or equal to 15 mm, for example. As such, the camera 15 is smaller and lighter than the arrangement state detection unit employed in the conventional technique.

The camera body 55 which fits in a circle whose diameter is smaller than or equal to 15 mm is shaped like a circle, an ellipse, an elongated circle, a polygon such as a rectangle (including a trapezoid and a rhombus), a pentagon, or a hexagon, a semicircle, or a teardrop shape in a front view as viewed from the subject side.

In the embodiment, the one overhead camera 59 and the two close-range cameras 61 are disposed in such a manner that their optical axes 63 parallel with each other. The optical axes 63 are located at the apices of a triangle in a plane that is perpendicular to the optical axes 63.

In the camera 15 according to the embodiment, the above-mentioned triangle is a regular triangle. The triangle in which the one overhead camera 59 and the two close-range cameras 61 are disposed is not limited to a regular triangle and may be an isosceles triangle or a scalene triangle.

The camera body 55 which houses the small-diameter cameras at the respective apices of a triangle may be a triangular cylinder. In the camera 15, the small-diameter cameras are fixed in an integrated manner by, for example, charging resin in a state that the small-diameter cameras are set inside the respective edges of the triangular cylinder.

In the camera 15, illumination openings 65 are formed at the centers of the respective sides of the triangle. A light exit end surface of a light-guide that is an optical fiber may be set in each illumination opening 65. Alternatively, an LED itself as an illumination light source may be set in each illumination opening 65.

Figure 4:
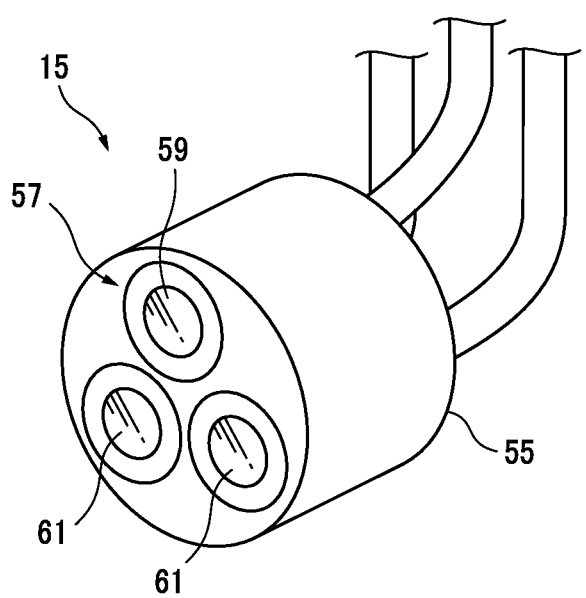
FIG. 4 is an enlarged perspective view of a modified version of the camera body.

FIG. 4 is an enlarged perspective view of a modified version of the camera body 55. The camera body 55 which houses the small-diameter cameras at the respective apices of a triangle may be a circular cylinder. Also in this case, the small-diameter cameras are fixed in an integrated manner by charging resin into the internal space of the circular cylinder camera body 55 in a state that the small-diameter cameras are set at the respective apices of the triangle. In the camera unit 57 of this modified version, the illumination openings 65 are omitted.

The camera 15 is provided with, in an integrated manner, plural camera devices (e.g., overhead camera and close-range cameras) which serve to image a workpiece W and are different in optical characteristics. The optical characteristics are the working distance, angle of view, etc. Reduction of the positional accuracy of the hand portion 27 for gripping a workpiece W is suppressed by switching the camera devices being different in optical characteristics according to the distance to the workpiece W. The term "working distance" means a distance from the tip of the lens of each camera device to a subject (e.g., workpiece W), that is, a distance with which focusing is attained. The term "angle of view" means an angular range in which an image can be taken through the lens.

In the camera 15, the working distance WD1 and the angle of view AV1 of the overhead camera 59 is set at, for example, 100 to 300 mm and 70°, respectively. The working distance WD2 and the angle of view AV2 of each close-range camera 61 are set at, for example, 5 to 99.9 mm and 100°, respectively. Switching to the camera device having a lens with a wide angle of view in imaging a workpiece W from a position near it enables wide-range imaging, that is, detection of the entire workpiece W, from even the position near the workpiece W.

The overhead camera 59 detects a position of a workpiece W by imaging the entire workpiece W through a single lens. The overhead camera 59 makes it possible to calculate an approximate distance to the workpiece W by making comparison for the size of the workpiece W between an image taken of the workpiece W and CAD data that is stored in a memory 83 in advance. The CAD data of the workpiece W includes data that indicates a size of the workpiece W such as an appearance shape and an outline. An image taken of the workpiece W being small means that the distance to the workpiece W is long, and an image taken of the workpiece W being large means that the distance to the workpiece W is short. The overhead camera 59 makes it possible to calculate an approximate distance by comparing the size of the image taken and the size indicated by the CAD data. The overhead camera 59 is low in resolution though it has a great focal length.

On the other hand, the close-range cameras 61 serve to measure a distance by imaging the whole of a workpiece W or part of it through two lenses. As for a method for obtaining a distance, the two close-range cameras 61 are arranged horizontally and take two images (an example of a pair of images) having a parallax simultaneously. The close-range cameras 61 need not image a workpiece simultaneously in the case where the workpiece W or the robot arm 21 is not moved during imaging. The close-range cameras 61 make it possible to obtain, through calculation, information in the depth direction of the workpiece W, that is, information of the subject as a three-dimensional body and to calculate a distance from the close-range cameras 61 to the workpiece W, on the basis of two images taken. The close-range cameras 61 are high in resolution though they are short in working distance. In the camera unit 57, switching is made between the overhead camera 59 and the close-range cameras 61 as appropriate.

Figure 12:
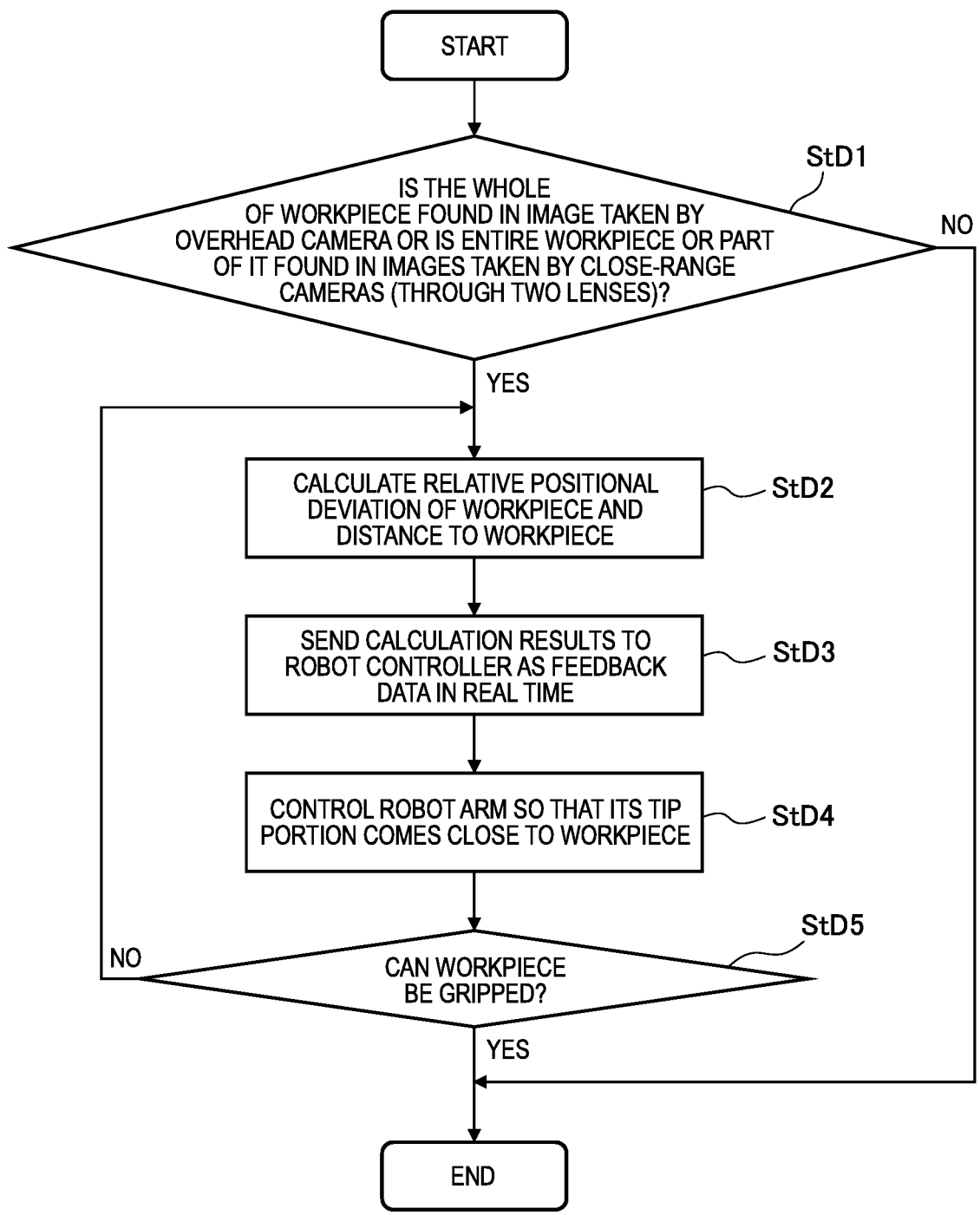
FIG. 12 is a flowchart showing the procedure of a process of bringing the tip of the robot arm close to a workpiece by controlling the robot arm in real time through real-time cooperation between the vision controller and the robot controller.

An image processing unit 77 of the vision controller 19 may acquire an image(s) taken by the overhead camera 59 or close-range cameras 61 at a short cycle (e.g., 0.002 sec or shorter), calculate a straight-line distance from the camera 15 to the workpiece W and a positional deviation of the workpiece W as viewed from the camera 15 (in other words, a deviation of a relative position of the workpiece W in a direction of viewing from the tip 35 of the robot arm 21) on the basis of the image(s) taken by the overhead camera 59 or close-range cameras 61, send (feedback) calculation results to the robot controller 17 in real time (e.g., within 0.002 sec or shorter from the imaging) as feedback data (see FIG. 12). For example, the image processing unit 77 can calculate a straight-line distance between the camera 15 and the workpiece W and a positional deviation of the workpiece W as viewed from the camera 15 by comparing an image taken by the overhead camera 59 with CAD data of the workpiece W stored in the memory 83 in advance (e.g., comparing a size of the workpiece W in the image taken and the CAD data. Alternatively, for example, the image processing unit 77 can calculate a straight-line distance between the camera 15 and the workpiece W and a positional deviation of the workpiece W as viewed from the camera 15 on the basis of the entire workpiece W or part of it in two images (an example of a pair of images) taken by the close-range cameras 61 through two lenses.

The robot controller 17 controls the portions of the robot arm 21 on the basis of feedback data sent from the vision controller 19 in real time so that the tip 35 of the robot arm 21 comes closer to the workpiece W. Since the robot arm 21 is controlled by the robot controller 17 on the basis of the feedback data that are sent from the vision controller 19 in real time, the tip 35 can be brought close to the workpiece W with higher accuracy at a higher speed and grip the workpiece W properly.

FIG. 12 is a flowchart showing the procedure of a process of bringing the tip 35 of the robot arm 21 close to a workpiece W by controlling the robot arm 21 in real time through real-time cooperation between the vision controller 19 and the robot controller 17.

At step StD1, the image processing unit 77 of the vision controller 19 judges whether the whole of a workpiece W is found in an image taken by the overhead camera 59 or the entire workpiece W or part of it is found in images taken by the close-range cameras 61. If the entire workpiece W is not found in the image taken by the overhead camera 59 or the entire workpiece W or part of it is not found in images taken by the close-range cameras 61 (StD1: NO), the process shown in FIG. 12 is finished.

On the other hand, if the entire workpiece W is found in the image taken by the overhead camera 59 or the entire workpiece W or part of it is found in images taken by the close-range cameras 61 (StD1: YES), at step StD2 the image processing unit 77 calculates a straight-line distance from the camera 15 to the workpiece W and a positional deviation of the workpiece W as viewed from the camera 15 (in other words, a deviation of a relative position of the workpiece W in a direction of viewing from the tip 35 of the robot arm 21). At step StD3, the image processing unit 77 sends (feeds back) calculation results of step StD2 to the robot controller 17 as feedback data in real time.

At step StD4, the robot controller 17 controls the portions of the robot arm 21 on the basis of the feedback data sent from the vision controller 19 in real time so that the tip 35 of the robot arm 21 comes close to the workpiece W. At step StD5, the image processing unit 77 of the vision controller 19 judges whether the finger members 25 of the tip 35 are located at such positions as to be able to grip the workpiece W on the basis of, for example, the images taken by the close-range cameras 61. The process shown in FIG. 12 is finished if it is judged that the finger members 25 of the tip 35 are located at such positions as to be able to grip the workpiece W (StD5: YES). On the other hand, the process returns to step StD2 if it is judged that the finger members 25 of the tip 35 are not located at such positions as to be able to grip the workpiece W (StD5: NO). That is, steps StD2-StD5 are executed repeatedly until the finger members 25 of the tip 35 come to be located at such positions as to be able to grip the workpiece W through real-time-cooperation between the robot controller 17 and the vision controller 19.

Figure 6A:
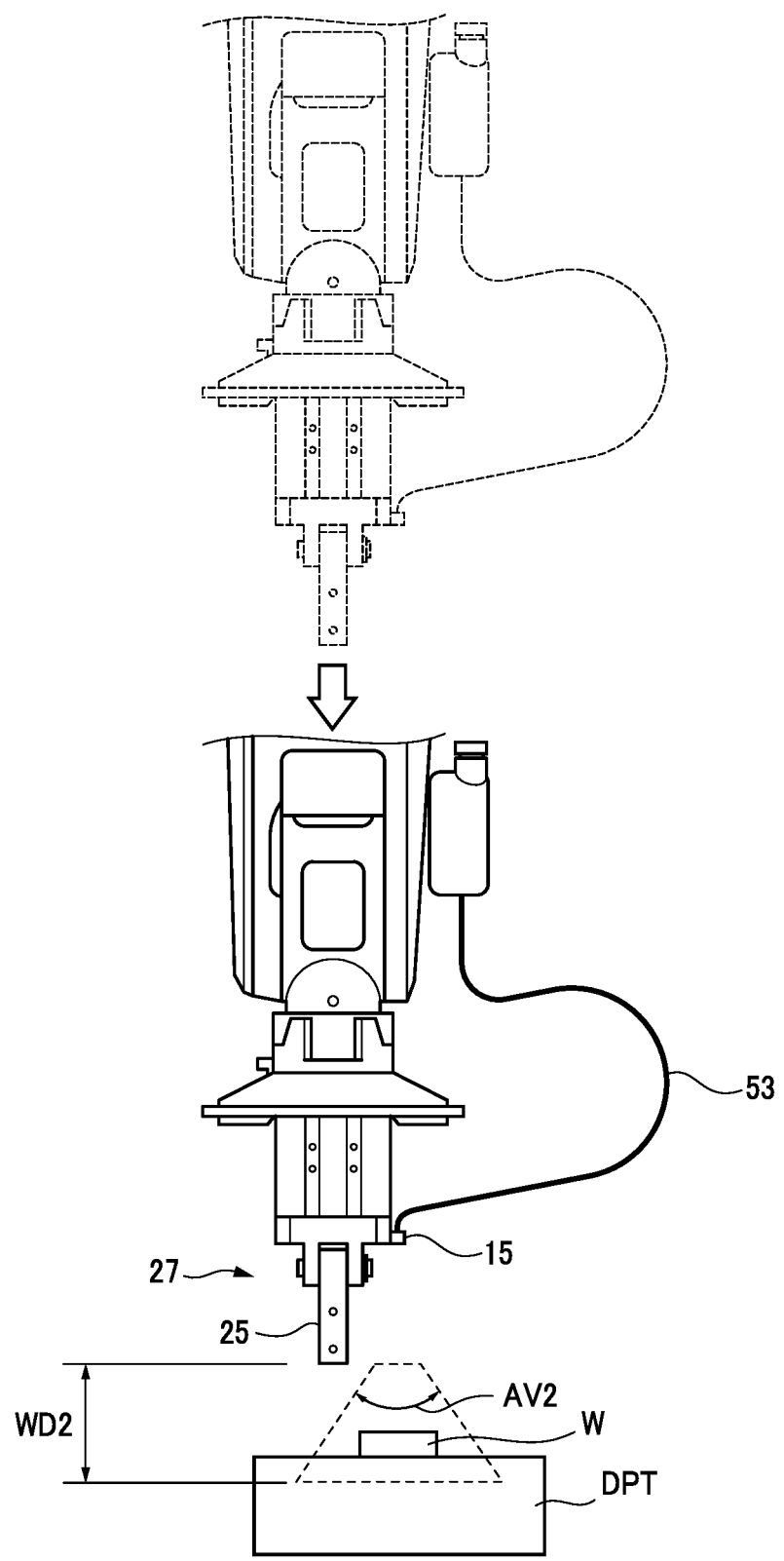
FIG. 6A is an enlarged side view of the tip of the robot arm in a state that the camera shown in FIG. 1 is operating in a close-range mode.
Figure 6B:
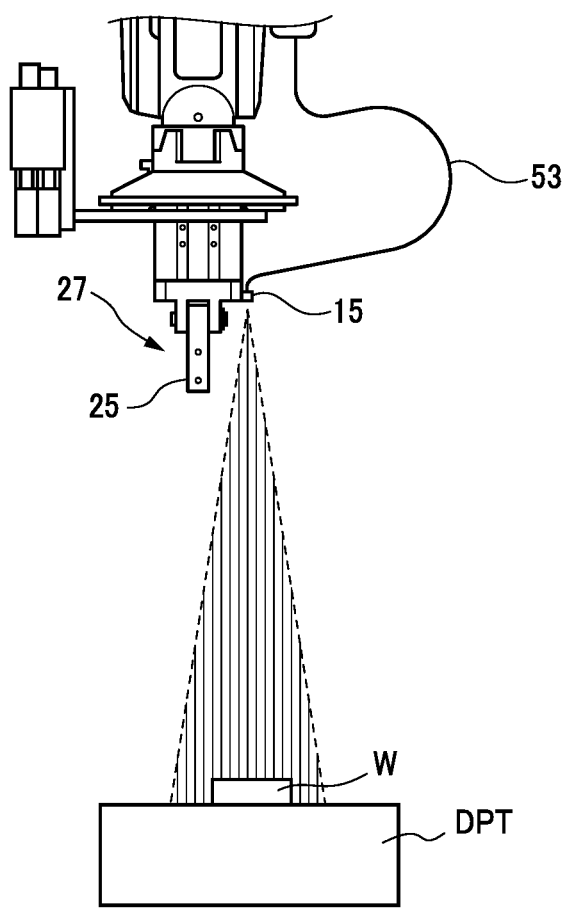
FIG. 6B is a diagram for description of an operation that pattern illumination from a light source is performed in a state that of the camera shown in FIG. 1 is operating in an overhead mode.
Figure 6C:
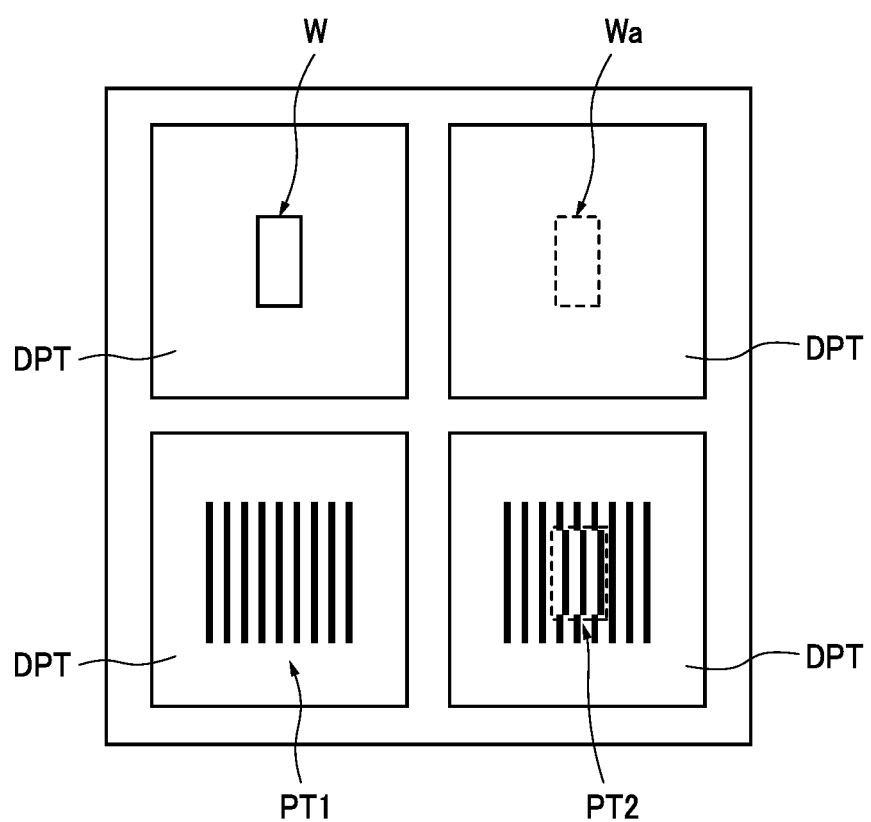
FIG. 6C is a diagram for description of a relationship between a mounting stage and a workpiece colors of a mounting stage and a workpiece and a projected pattern.

FIG. 6B is a diagram for description of an operation that pattern illumination from a light source is performed in a state that the camera 15 shown in FIG. 1 is operating in an overhead mode. FIG. 6C is a diagram for description of a relationship between colors of a mounting stage DPT and a workpiece W and a projected pattern. As shown in FIG. 6C, when a workpiece Wa and a mounting stage DPT mounted with it are close to each other in color, there may occur a case that the overhead camera 59 cannot recognize a shape of the workpiece Wa (i.e., image edges cannot be detected), in which case a calculation for measuring a distance cannot be performed. One countermeasure is to install a light source capable of projecting a desired pattern PT1 in the illumination opening 65 formed between the two close-range cameras 61 and imaging the pattern PT1. With this measure, even if a shape of the workpiece Wa cannot be recognized, it becomes possible to measure a distance to the workpiece Wa by recognizing an image of a pattern-projected workpiece PT2. Examples of the desired pattern are a dot-shaped pattern as projected by a laser pointer or a particular pattern such as a circle, a rectangle, a triangle, or stripes.

Figure 5:
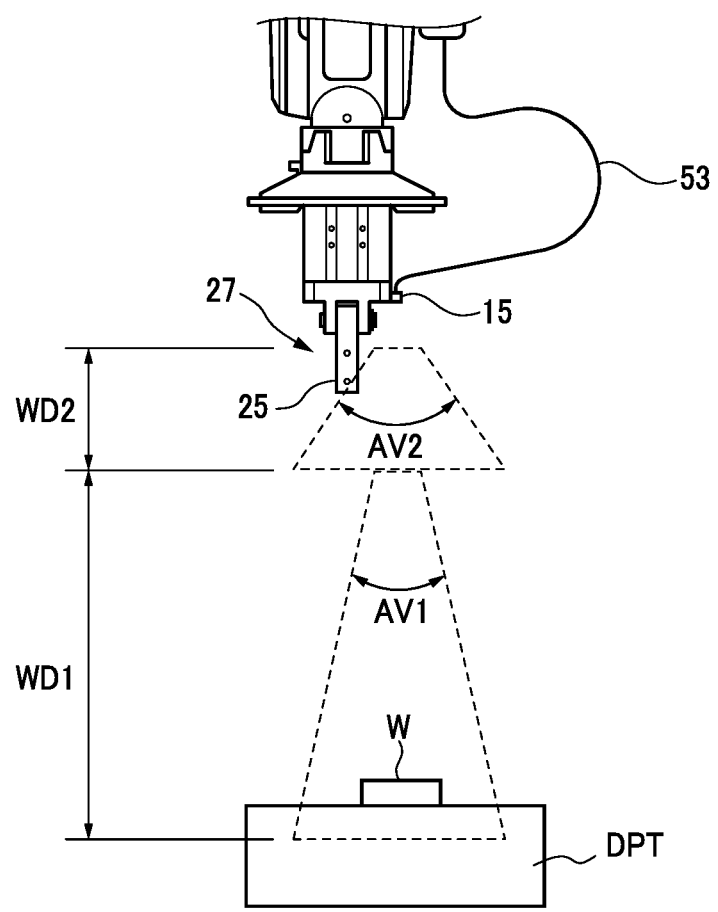
FIG. 5 is an enlarged side view of the tip of the robot arm in a state that an overhead camera of the camera 15 shown in FIG. 1 is in operation.

FIG. 5 is an enlarged side view of the tip 35 of the robot arm 21 in a state that the overhead camera 59 of the camera 15 shown in FIG. 1 is in operation. If the distance to a workpiece W is longer than or equal to 100 mm, the camera 15 operates with its use mode switched from a close-range mode to an overhead mode. That is, where the distance to a workpiece W is longer than or equal to 100 mm, the camera 15 operates in the overhead mode.

FIG. 6A is an enlarged side view of the tip 35 of the robot arm 21 in a state that the camera 15 is operating in the close-range mode. If the distance to a workpiece W is shorter than or equal to 99.9 mm, the camera 15 operates with its use mode switched from the overhead mode to the close-range mode. That is, where the distance to a workpiece W is shorter than or equal to 99.9 mm, the camera 15 operates in the close-range mode.

Figure 7:
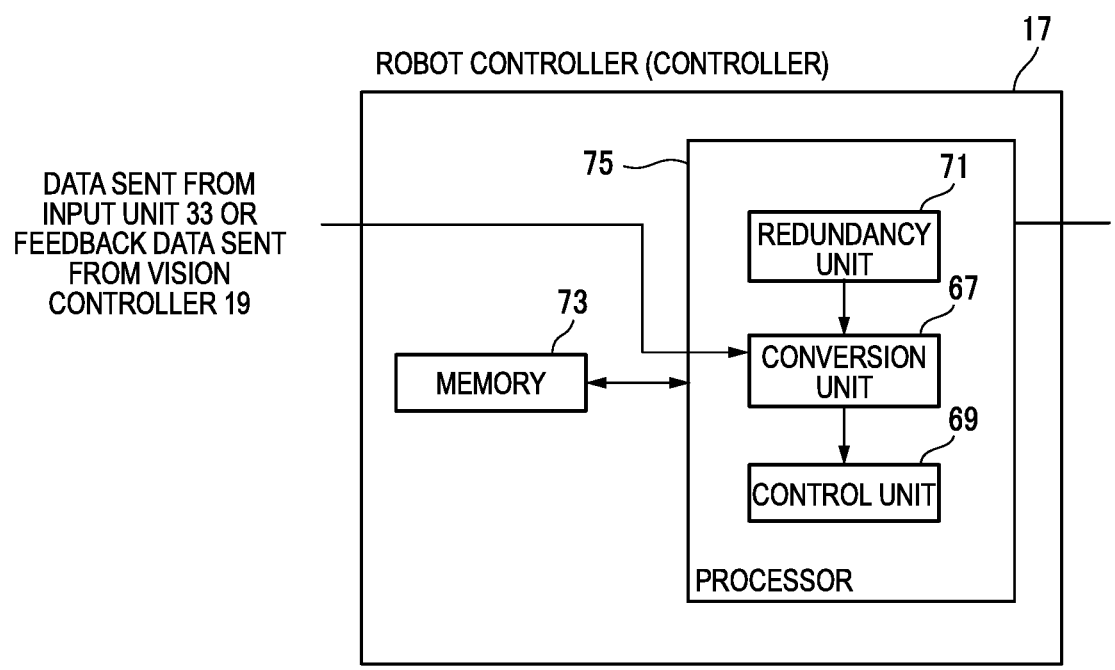
FIG. 7 is a block diagram of a robot controller shown in FIG. 1.

FIG. 7 is a block diagram of the robot controller 17 shown in FIG. 1. The controller generates a control signal for controlling an operation of the robot arm 21 on the basis of imaging information acquired by the camera 15. In the embodiment, the controller has the robot controller 17 and the vision controller 19. The robot controller 17 and the vision controller 19 may be integrated together in the form of a processor that is implemented as a CPU (central processing unit), a DSP (digital signal processor), an FPGA (field-programmable gate array), or the like to constitute the controller.

The robot controller 17 has a conversion unit 67, a control unit 69, a redundancy unit 71, and a memory 73. The conversion unit 67, the control unit 69, the redundancy unit 71 may constitute a processor 75.

The conversion unit 67 converts data of mathematical expressions that are input through the input unit 33 into drive programs for driving the servo motors 23 of the robot 13 using kinetic geometry and algebra, for example.

The control unit 69 causes the robot 13 to perform a setting operation according to the drive programs generated by the conversion unit 67 by conversion. The control unit 69 has a processor such as a DSP (digital signal processor), a dedicated computation device, a memory, etc. The control unit 69 derives movement destination positions of the six respective axes instantaneously through multiply-accumulate operations on the basis of three-dimensional positional relationships between standard orthogonal coordinates of the robot 13 and orthogonal coordinates of the robot 13 that are set by an operator and outputs control signals to the servo motors 23.

The redundancy unit 71 adds redundancy programs for performing a redundancy operation that is different from the setting operation to the drive programs generated by the conversion unit 67 by conversion. For example, the redundancy operation is an operation of moving the robot 13 to a target position while avoiding an obstacle immediately before or after collision with it during a movement of the robot 13.

The memory 73 stores the data of mathematical expressions that are input through the input unit 33, the drive programs generated by the conversion unit 67, the redundancy programs generated in advance, etc.

Figure 8:
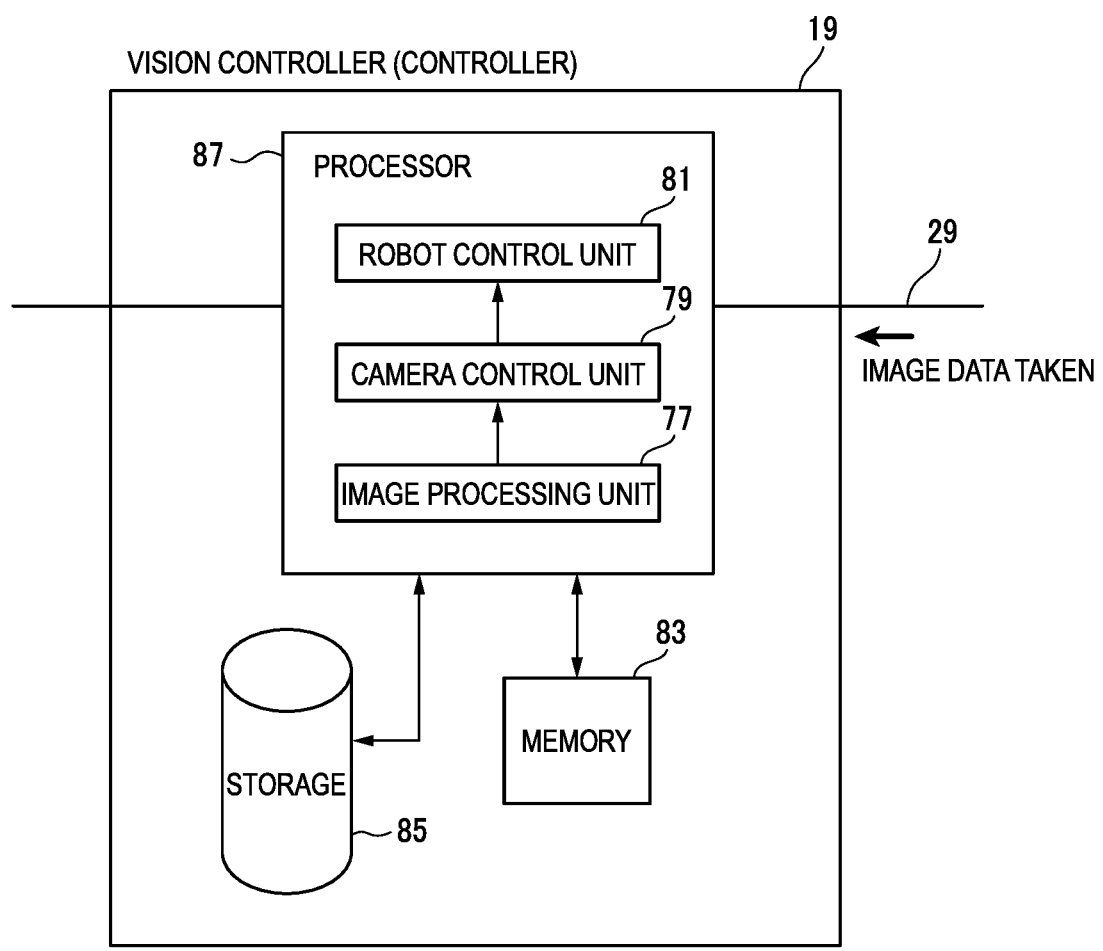
FIG. 8 is a block diagram of a vision controller shown in FIG. 1.

FIG. 8 is a block diagram of the vision controller 19 shown in FIG. 1. Image data taken that is sent from the camera 15 is input to the vision controller 19. The vision controller 19 has an image processing unit 77, a camera control unit 79, a robot control unit 81, a memory 83, and a storage 85. The image processing unit 77, the camera control unit 79, the robot control unit 81 may constitute a processor 87.

The image processing unit 77 performs image processing on the basis of image data taken that is sent from the camera 15. Image-processed data generated by the image processing unit 77 is sent to the camera control unit 79.

The camera control unit 79 acquires overhead camera focal point data and close-range camera focal point data on the basis of the image-processed data sent from the image processing unit 77. The acquired camera focal point data are sent to the robot control unit 81. The camera focal point data are stored in the storage 85.

The robot control unit 81 acquires camera operation data on the basis of the camera focal point data sent from the camera control unit 79 and other data. The acquired camera operation data is sent to the robot controller 17. The camera operation data is stored in the storage 85.

Figure 9:
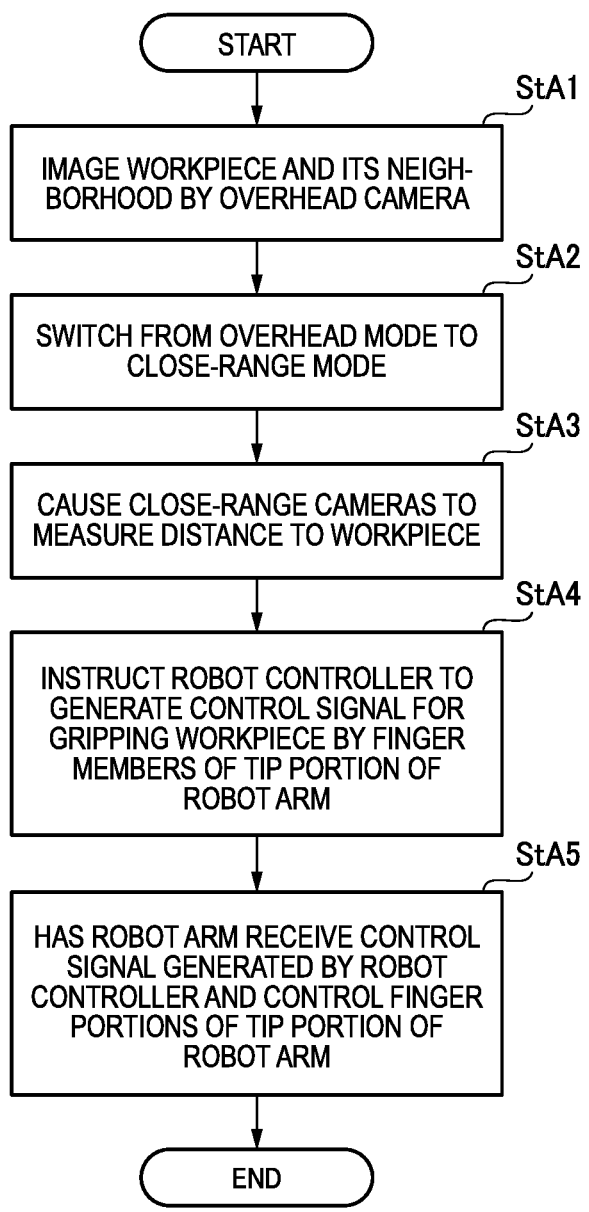
FIG. 9 is a flowchart showing the procedure of a process executed by the vision controller.

FIG. 9 is a flowchart showing the procedure of a process executed by the vision controller 19. In the robot system 11, at step StA1, the overhead camera 59 of the camera unit 57 images a workpiece W and its neighborhood according to a control signal sent from the vision controller 19.

When the hand portion 27 is moved according to a control signal sent from the robot controller 17 and comes close to the workpiece W, at step StA2 the use mode of the camera unit 57 is switched from the overhead mode to the close-range mode.

At step StA3, the camera unit 57 measures a distance to the workpiece W by means of the close-range cameras 61.

At step StA4, the vision controller 19 brings the robot arm 21 closer to the workpiece W on the basis of the measured distance and instructs the robot controller 17 to generate a control signal for gripping the workpiece W by the finger members 25 of the tip 35 of the robot arm 21.

At step StA5, the robot arm 21 receives the control signal generated by the robot controller 17 and the finger members 25 provided in the hand portion 27 of the tip 35 is controlled.

Figure 10:
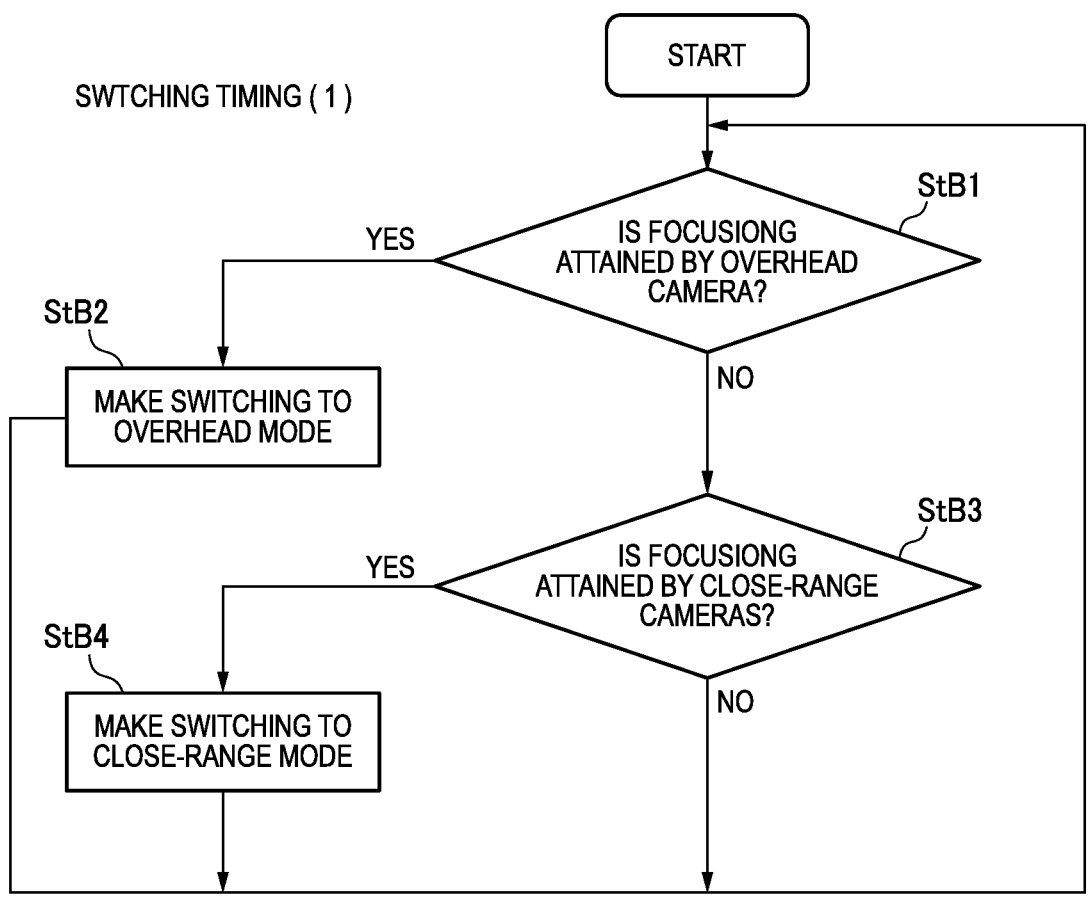
FIG. 10 is a flowchart showing the procedure of a process in which mode switching is made depending on whether focusing is attained.

FIG. 10 is a flowchart showing the procedure of a process in which mode switching is made depending on whether focusing is attained. In the robot system 11, switching needs to be made in the camera unit 57 because the overhead camera 59 and the close-range cameras 61 have different working distances.

For example, the controller may be configured so that the use mode of the camera unit 57 is switched between the overhead mode and the close-range mode at such timing that the overhead camera 59 or the close-range cameras 61 become out of focus.

In this case, first, at step StB1, the controller judges whether focusing is attained by the overhead camera 59. If focusing is attained, at step StB2 the use mode of the camera unit 57 is switched to the overhead mode. On the other hand, focusing is not attained by the overhead camera 59, it is judged at step StB3 whether focusing is attained by the close-range cameras 61. If focusing is attained, at step StB4 the use mode of the camera unit 57 is switched to the close-range mode.

Figure 11:
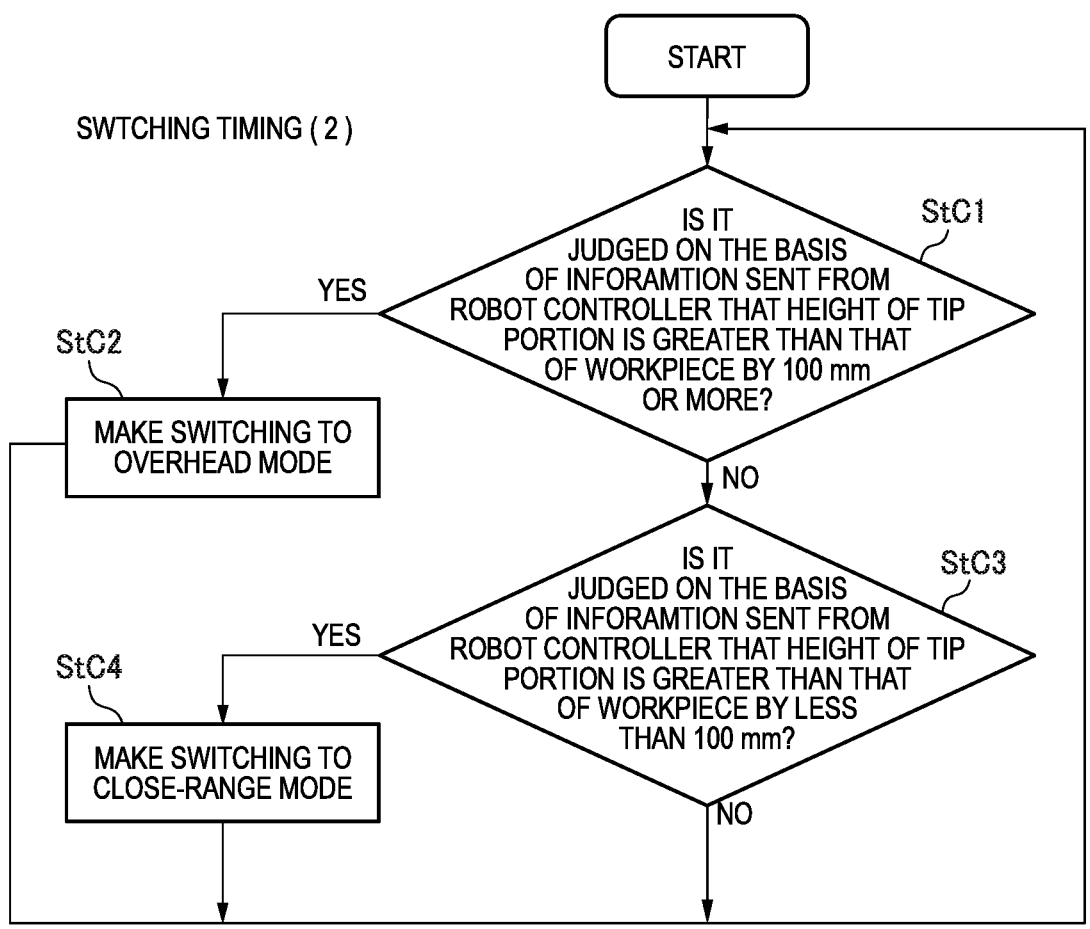
FIG. 11 is a flowchart showing the procedure of a process in which mode switching is made using information sent from an external apparatus.

FIG. 11 is a flowchart showing the procedure of a process in which mode switching is made using information sent from an external apparatus.

The controller may be configured so that the use mode of the camera unit 57 is switched to the overhead mode or the close-range mode on the basis of information sent from an external apparatus. In this case, first, at step StC1, the controller judges on the basis of information sent from the robot controller 17 whether the height of the tip 35 of the robot arm 21 is greater than that of the workpiece W by 100 mm or more. If the height of the tip 35 of the robot arm 21 is greater than that of the workpiece W by 100 mm or more (StC1: YES), at step StC2 the use mode of the camera unit 57 is switched to the overhead mode. On the other hand, if the height of the tip 35 of the robot arm 21 is not greater than that of the workpiece W by 100 mm or more (StC1: NO), it is judged at step StC3 whether the height of the tip 35 of the robot arm 21 is greater than that of the workpiece W by less than 100 mm. If the height of the tip 35 of the robot arm 21 is greater than that of the workpiece W by less than 100 mm (StC3: YES), at step StC4 the use mode of the camera unit 57 is switched to the close-range mode.

Next, the workings of the above-described configurations will be described.

The camera 15 according to the embodiment is equipped with the camera body 55 attached to the tip 35 of the robot arm 21 and the camera unit 57 housed in the camera body 55. Plural camera devices that are different in optical characteristics are integrated with each other in the camera unit 57. For example, the plural camera devices that are different in optical characteristics are the one overhead camera 59 and the two close-range cameras 61 that are different in working distance and angle of view and are integrated with each other.

In the camera 15 according to the embodiment, the camera unit 57 is provided in the tip 35 of the robot arm 21. The camera unit 57 is configured in such a manner that the one overhead camera 59 and the two close-range cameras 61 are housed in the camera body 55. That is, the camera unit 57 is a three-lens tip-mounted camera in which plural cameras having different focal lengths are combined together.

It is preferable that the camera that is attached to the tip 35 of the robot arm 21 be a small camera such as the camera 15 according to the embodiment so that the camera does not restrict movement of the robot arm 21. In other words, it is difficult to provide the camera 15 with an autofocus mechanism as provided in conventional cameras. However, the camera 15 according to the embodiment makes it possible to easily perform a position control on the hand portion 27 until gripping of a workpiece W while continuing to recognize the position of the workpiece W by causing one or ones of the camera devices to continue to image the workpiece W by providing the camera 15 with camera devices having plural different working distances (WDs) (short focal lengths). Since the camera unit 57 of the camera 15 is provided in the tip 35 of the robot arm 21 via the camera body 55, no blind area is formed unlike in the conventional robot system in which the camera is disposed above the stocker. Thus, the camera 15 is free of a problem that the hand portion 27 or the robot arm 21 itself form a blind area and a position (coordinates) of a workpiece W is made unknown. As a result, it becomes possible to suppress reduction of the positional accuracy of the hand portion 27 for gripping a workpiece W and thereby increase the efficiency of workpiece.

Since the camera 15 is light, cost increase of the controller can be suppressed though the camera 15 is provided in the robot arm 21. That is, where a heavy camera is attached, to grip a workpiece W properly it is necessary to take a proper measure for preventing the hand portion 27 from deviating during an arm movement taking the weight of the camera into consideration. This makes it necessary to manufacture gears and motors so that they are high in stiffness, resulting in cost increase of the robot system. In contrast, since the camera 15 is light, ordinary gears and motors can be used, which makes it possible to suppress cost increase of the robot arm 21.

Furthermore, since the camera 15 is small, no large part of it projects from the hand portion 27. Thus, even if a certain object exists around the hand portion 27, it is not necessary to make a large action to clear the object. This makes it possible to prevent the drive range of the robot arm 21 from being narrowed.

In the camera 15, the two close-range cameras 61 are same camera devices having the same working distance, image the same workpiece W at the same time to acquire a pair of images having a parallax, and cause a distance from the two close-range cameras 61 to the workpiece W to be calculated on the basis of the pair of images.

By arranging the two close-range cameras 61 in the horizontal direction and causing them to take two images having a parallax simultaneously, a pair of images having a parallax commensurate with a difference between the camera positions can be obtained from the two images. The camera 15 makes it possible to obtain information in the depth direction, that is, three-dimensional information, of the workpiece W and information of a distance from the close-range cameras 61 to the workpiece W by causing calculation based on the image information thus obtained. The accuracy of calculation of a distance increases as the distance between the close-range cameras 61 and the workpiece W decreases. The camera 15 realizes positioning whose accuracy increases gradually by calculating a distance plural times as it approaches the workpiece W.

In the camera 15, the use mode of the camera unit 57 is switched from the overhead mode in which the overhead camera 59 is used to the close-range mode in which the close-range cameras 61 are used.

In the camera 15, when the hand portion 27 provided in the tip 35 of the robot arm 21 comes close to a workpiece W, the use mode of the camera unit 57 is switched from the overhead mode in which the overhead camera 59 is used (i.e., the close-range cameras 61 are not used) to the close-range mode in which the two close-range cameras 61 are used (i.e., the overhead camera 59 is not used). In the camera unit 57, when switching is made to the close-range mode, the resolution of an image taken becomes higher and more accurate positional information can be obtained. This makes it possible to perform high-accuracy operation control on the robot arm 21 and the hand portion 27.

In the camera 15, the use mode of the camera unit 57 is switched from the close-range mode in which the close-range cameras 61 are used to the overhead mode in which the overhead camera 59 is used.

In the camera 15, when the hand portion 27 provided in the tip 35 of the robot arm 21 goes away from a workpiece W, the use mode of the camera unit 57 is switched from the close-range mode in which the two close-range cameras 61 are used (i.e., the overhead camera 59 is not used) to the overhead mode in which the overhead camera 59 is used (i.e., the close-range cameras 61 are not used). In the camera unit 57, when switching is made to the overhead mode, the focal length is made greater and positional information of the entire workpiece W can be obtained. This makes it possible to perform operation control on the robot arm 21 and the hand portion 27 so that they operate in wide ranges.

The one overhead camera 59 and the two close-range cameras 61 are arranged in such a manner that their optical axes 63 are parallel with each other and located at respective apices of a triangle in a plane that is perpendicular to the optical axes 63.

In the camera 15, the three small-diameter cameras (more specifically one overhead camera 59 and two close-range cameras 61) whose optical axes 63 are parallel with each other may be arranged so as to be located at the respective apices of a triangle in a plane perpendicular to the optical axes 63. The camera body 55 may be formed so as to assume a triangular prism shape capable of covering the three small-diameter cameras in a most compact manner. A desired side surface of the camera body 55 assuming a triangular prism shape can be fixed to the tip 35 (e.g., hand portion 27) of the robot arm 21 with high strength. In this case, the pair of small-diameter cameras located at both ends of the base of the triangle and thus spaced from each other can be employed as the close-range cameras 61 and the top small-diameter camera can be employed as the overhead camera 59. Where the hand portion 27 is configured in such a manner that the pair of finger members 25 can come closer to and go away from each other, the close-range cameras 61 can be disposed close to the finger members 25.

In the camera 15, the triangle that is defined by the positions where the three small-diameter cameras (more specifically, one overhead camera 59 and two close-range cameras 61) are located in a plane that is perpendicular to the optical axes 63 may be a regular triangle.

In the camera 15, the camera body 55 can be minimized in contrast to the cases that the triangle is an isosceles triangle or a scalene triangle and the positional deviations of the overhead camera 59 and the close-range cameras 61 with respect to the finger members 25 can be made small.

In the camera 15, the illumination opening 65 is formed at the center of each side of the triangle.

In the camera 15, each of the plural illumination openings 65 can be formed at equal intervals from the adjacent two of the one overhead camera 59 and the two close-range cameras 61. The plural small-diameter cameras and illumination openings 65 can be laid out compactly at a high density, which makes it possible to miniaturize the camera body 55.

In the camera unit 57, an illumination opening 65 is formed between the two close-range cameras 61.

The illumination openings 65 are arranged in the camera 15. In many cases, an illumination device is disposed separately from a camera. Where illumination devices are provided in the camera 15, since the camera 15 which includes the illumination devices is small and hence no large part of it projects from the hand portion 27. Thus, even if a certain object exists around the hand portion 27, it is not necessary to make a large action to clear the object. This makes it possible to prevent the drive range of the robot arm 21 from being narrowed.

A light source for illuminating a workpiece W is provided in each illumination opening 65.

The illumination device provided in each illumination opening 65 may be an optical fiber or an LED. The quantity of emitted light can be adjusted according to a necessary light intensity.

A light source capable of projecting a prescribed pattern is provided in an illumination opening 65.

An illumination device capable of projecting a particular pattern may be provided in an illumination opening 65. There may occur a case that the shape of a workpiece W cannot be recognized (i.e., image edges cannot be detected) because the workpiece W and a mounting stage that is mounted with the workpiece W are close to each other in color. In such a case, it is possible to recognize the shape of the workpiece W by illuminating it with light having a particular pattern. For example, projecting, for example, a stripe pattern the shape of the workpiece W can be judged on the basis of how an image of a part, projected on a portion, different from the mounting stage in height, of the workpiece W, of the stripe pattern is formed.

The two close-range cameras 61 have the same working distance, simultaneously image a prescribed pattern projected by the light source to acquire a pair of pattern images having a parallax, and causes calculation of a distance from the two close-range cameras 61 to a pattern projection surface on which the pattern is projected.

When a workpiece W and a mounting stage mounted with it are close to each other in color, there may occur a case that the shape of the workpiece W cannot be recognized (i.e., image edges cannot be detected), in which case a calculation for measuring a distance cannot be performed. One countermeasure is to install a light source capable of projecting a desired pattern in the illumination opening 65 formed between the two close-range cameras 61 and imaging a projected pattern. With this measure, even if the shape of the workpiece W cannot be recognized, it becomes possible to measure a distance to the workpiece W by recognizing an image of a pattern-projected workpiece. Examples of the desired pattern are a dot-shaped pattern as projected by a laser pointer or a particular pattern such as a circle, a rectangle, a triangle, or stripes.

In the camera 15, the camera body 55 is disposed at the middle between the pair of finger members 25 that are attached to the tip 35 of a robot arm 21 so as to be able to come closer to and go away from each other.

In the camera 15, the camera body 55 is disposed at the middle between the pair of finger members 25 that can come closer to and go away from each other. The camera body 55 is disposed in the tip 35 of the robot arm 21, more specifically, at the center of a line segment that connects the pair of finger members 25 in an imaginary plane that is perpendicular to and crosses the line segment. As a result, the camera 15 can always be located at the middle between the pair of finger members 25 that can come closer to and go away from each other in that plane, whereby position information of a working point 89 (see FIG. 2) as the center of a workpiece W can be detected easily.

The overhead camera 59 which is disposed at an apex of a triangular end of a triangular prism shape of the camera body 55 can be located at the middle between the pair of finger members 25. This makes it possible to suppress positional deviations (gaps) of the overhead camera 59 with respect to the finger members 25 to small values. This in turn makes it possible to dispense with calibration.

The robot system 11 according to the embodiment is equipped with the camera body 55 attached to the tip 35 of the robot arm 21, the cameral 5 including the camera unit 57 which is housed in the camera body 55 and in which the one overhead camera 59 and the two close-range cameras 61 that are different from the overhead camera 59 in working distance are integrated with each other, and the controller which generates a control signal for controlling operation of the robot arm 21 on the basis of imaging information acquired by the camera 15.

In the robot system 11 according to the embodiment, a distance to a workpiece W that is necessary to perform a control for causing the hand portion 27 to grip the workpiece W is detected by the camera 15 which is disposed in the tip 35 of the robot system 11. Since the camera 15 is disposed in the tip 35 of the robot arm 21, no blind area is formed unlike in the conventional robot system in which the camera is disposed above the stocker. Thus, the camera 15 is free of a problem that the hand portion 27 or the robot arm 21 itself forms a blind area and a position (coordinates) of a workpiece W is made unknown. As a result, it becomes possible to suppress increase of the number of workpieces W that cannot be held by the hand portion 27.

The robot arm disclosed in Patent document 1 is equipped with the holding state detection camera which is to detect (through imaging) a holding state of a workpiece W being held by the hand portion and is not to detect a distance to the workpiece W to control holding of the workpiece W by the hand portion.

Since the camera 15 is small, it can be installed even at a position that is so close to the hand portion 27 that calibration for correcting coordinate differences is not necessary. As a result, the robot system 11 can simplify calculation of control information for allowing operation of the robot arm 21 and thereby allows the robot arm 21 to operate faster than in a case that complex calibration needs to be performed. Furthermore, the robot system 11 according to the embodiment makes it possible to suppress increase of the number of workpieces W that cannot be held by the hand portion 27.

At timing when one or ones of the plural camera devices (e.g., overhead camera 59 and close-range cameras 61) that are different in optical characteristics become out of focus, the controller switches the use mode of the camera unit 57 to a mode corresponding to the other or others of the plural camera devices.

In the robot system 11, since the overhead camera 59 and the close-range cameras 61 are different in working distance, it is necessary to switch from the overhead camera 59 to the close-range cameras 61 or in an opposite way, that is, from the close-range cameras 61 to the overhead camera 59. Switching between the overhead camera 59 and the close-range cameras 61 is performed at timing when one or ones of them become out of focus. For example, the overhead camera 59 is turned off and the close-range cameras 61 are turned on when the overhead camera 59 is out of focus. Conversely, the close-range cameras 61 are turned off and the overhead camera 59 is turned on when the close-range cameras 61 are out of focus.

The controller may switch the use mode of the camera unit 57 to a mode corresponding to one or ones of the plural camera devices (e.g., overhead camera 59 and close-range cameras 61) that are different in optical characteristics on the basis of information sent from an external apparatus.

In the robot system 11, when information supplied from the controller indicates that the height of the robot arm 21 from a target is smaller than a prescribed value, the overhead camera 59 is turned off and the close-range cameras 61 are turned on. Conversely, when the height of the robot arm 21 from a target is larger than or equal to the prescribed value, use mode switching is made so that the close-range cameras 61 are turned off and the overhead camera 59 is turned on.

Although the embodiment has been described above with reference to the drawings, it goes without saying that the disclosure is not limited to this example. It is apparent that those skilled in the art would conceive various changes, modifications, replacements, additions, deletions, or equivalents within the confines of the claims, and they are construed as being included in the technical scope of the disclosure. Constituent elements of the above-described embodiment can be combined in a desired manner without departing from the spirit and scope of the invention.

INDUSTRIAL APPLICABILITY

The disclosure is useful in providing cameras and robot systems capable of suppressing reduction of the positional accuracy of a hand portion for gripping a workpiece and thereby increasing the efficiency of workpiece.

What is claimed is:
1. A camera comprising:
a camera body attached to a tip of a robot arm; and
a camera unit comprising one overhead camera and two close-range cameras mounted adjacent to each other in the same said camera body, wherein:
the one overhead camera has a different working distance from the two close-range cameras,
the one overhead camera and the two close-range cameras are arranged so that optical axes of the one overhead camera and the two close-range cameras are parallel with each other,
the one overhead camera is located above a center of each of the two close-range cameras within the same plane of the camera body so that lines connecting the centers of the close-range camera and the one overhead camera form a triangle,
the camera unit includes a plurality of camera devices that are different in optical characteristics for imaging a workpiece,
the two close-range cameras are configured to calculate a distance from the camera body to the workpiece, the two close-range cameras and the one overhead camera are actuated according to distance information to the workpiece calculated by the two close-range cameras, and when either the one overhead camera or the two close-range cameras is actuated, the other is turned off.

2. The camera according to claim 1,
wherein the two close-range cameras have the same camera devices having a same working distance, image a same workpiece simultaneously, acquire a pair of image having a parallax, and cause the distance from the two close-range cameras to the workpiece to be calculated on the basis of the pair of images.

3. The camera according to claim 1,
wherein a use mode of the camera unit is switched from an overhead mode in which the overhead camera is used to a close-range mode in which the two close-range cameras are used.

4. The camera according to claim 1,
wherein a use mode of the camera unit is switched from a close-range mode in which the two close-range cameras are used to an overhead mode in which the overhead camera is used.

5. The camera according to claim 1,
wherein the optical axes of the one overhead camera and the two close-range cameras are located at respective apices of the triangle in a plane that is perpendicular to the optical axes.

6. The camera according to claim 5,
wherein the triangle is a regular triangle.

7. The camera according to claim 5,
wherein an illumination opening is formed at a center of each side of the triangle.

8. The camera according to claim 1,
wherein an illumination opening is formed between the two close-range cameras.

9. The camera according to claim 8,
wherein a light source for illuminating the workpiece is provided in the illumination opening.

10. The camera according to claim 8,
wherein a light source configured to project a prescribed pattern is provided in the illumination opening.

11. The camera according to claim 10,
wherein the two close-range cameras have a same working distance, simultaneously image light of the prescribed pattern projected from the light source, acquire a pair of pattern images having a parallax, and cause calculation of a distance from the two close-range cameras to a pattern projection surface on which the light of the pattern is projected.

12. The camera according to claim 1,
wherein the camera body is disposed at a middle between a pair of finger members that are attached to a tip a robot arm, wherein each finger member of the pair of finger members extends parallel to an axis of rotation of the robot arm, and wherein each finger member of the pair of finger members adjustably extends toward and away from each other.

13. A robot system comprising:
a camera body which is attached to a tip of a robot;
a camera unit comprising a plurality of camera devices that are different in optical characteristics for imaging a workpiece, the camera unit comprising one overhead camera and two close-range cameras mounted adjacent to each other in the same said camera body, wherein:
the one overhead camera has a different working distance from the two close-range cameras,
the one overhead camera and the two close-range cameras are adjacently arranged so that optical axes of the one overhead camera and the two close-range cameras are parallel with each other,
the one overhead camera is located above a center of each of the two close-range cameras within the same plane of the camera body so that lines connecting the centers of the close-range camera and the one overhead camera form a triangle,
the two close-range cameras are configured to calculate a distance from the camera body to the workpiece, and
the two close-range cameras and the one overhead camera are actuated according to distance information to the workpiece calculated by the two close-range cameras, and when either the one overhead camera or the two close-range cameras is actuated, the other is turned off; and
a controller which generates a control signal for controlling operation of the robot arm on the basis of imaging information acquired by the camera unit.

14. The robot system according to claim 13,
wherein at timing when one camera device of the plurality of camera devices that are different in the optical characteristics becomes out of focus, the controller switches a use mode to another camera device of the plurality of camera devices that is different in the optical characteristics.

15. The robot system according to claim 13,
wherein the controller switches a use mode to any camera device of the plurality of camera devices that are different in the optical characteristics based on information sent from an external apparatus.

* * * * *